(12) United States Patent
Meatto et al.

(10) Patent No.: US 6,660,114 B2
(45) Date of Patent: Dec. 9, 2003

(54) METHOD FOR PRODUCING A HYBRID LEAF SPRING

(75) Inventors: Frank Meatto, Ridgway, CO (US); Edward Pilpel, Avon, CT (US); D. Michael Gordon, Montrose, CO (US); David C. Gordon, Jr., Vista, CA (US)

(73) Assignee: Pacific Coast Composites, Montrose, CO (US)

( * ) Notice: Subject to any disclaimer, the term of this patent is extended or adjusted under 35 U.S.C. 154(b) by 0 days.

(21) Appl. No.: 10/102,100

(22) Filed: Mar. 19, 2002

(65) Prior Publication Data

US 2002/0096249 A1 Jul. 25, 2002

Related U.S. Application Data

(63) Continuation-in-part of application No. 09/490,308, filed on Jan. 24, 2000.

(51) Int. Cl.$^7$ .............................................. B32B 31/00
(52) U.S. Cl. ...................... 156/64; 156/222; 156/273.7; 156/274.8; 156/275.5; 156/307.7; 264/47; 72/386; 72/412; 29/896.91
(58) Field of Search ................ 156/64, 272.2, 156/272.4, 273.7, 273.9, 274.2, 274.4, 274.8, 275.5, 275.7, 281, 285, 307.1, 307.7, 358, 359, 280, 221, 222; 267/36.1, 47; 72/386, 412, 414; 29/896.9, 896.91

(56) References Cited

U.S. PATENT DOCUMENTS

| | | | | |
|---|---|---|---|---|
| 2,175,231 A | | 10/1939 | Thompson | .................. 267/47 |
| 2,518,867 A | * | 8/1950 | Clary | ...................... 29/896.91 |
| 3,204,944 A | * | 9/1965 | Brownyer | .................... 267/47 |
| 3,490,758 A | * | 1/1970 | Foster | .......................... 267/47 |
| 4,506,535 A | * | 3/1985 | Eubanks | .................... 72/389.6 |
| 4,747,898 A | * | 5/1988 | Woltron | ...................... 156/153 |
| 5,187,969 A | * | 2/1993 | Morita | ......................... 72/413 |
| 6,012,709 A | | 1/2000 | Meatto et al. | ............. 267/36.1 |
| 6,461,455 B1 | | 10/2002 | Meatto et al. | ................. 156/64 |

OTHER PUBLICATIONS

Copy of International Search report dated Jul. 1, 2003 for Application No PCT/US03/08086.

\* cited by examiner

*Primary Examiner*—Mark A. Osele
(74) *Attorney, Agent, or Firm*—McCormick, Paulding & Huber LLP (57) ABSTRACT

In a method for making a hybrid leaf spring, at least one layer of composite material is molded onto a primary leaf using a mold with an interior cavity having a curvature for receiving the primary leaf at a depressed camber relative to its initial camber. The depressed camber is between unloaded and curb load cambers of the hybrid leaf spring. The primary leaf and the layer of composite material are positioned in the mold adjacent to one another and with a layer of adhesive therebetween. The layer of adhesive is cured for bonding together the primary leaf and the layer of composite material at the depressed camber so as to generally eliminate bond line shear stress when the camber of the hybrid leaf spring is at the curb height.

12 Claims, 5 Drawing Sheets

METHOD FOR PRODUCING A HYBRID LEAF SPRING

CROSS REFERENCE TO RELATED APPLICATION

This is a continuation-in-part of application Ser. No. 09/490,308, filed Jan. 24, 2000, the disclosure of which is herein incorporated by reference.

FIELD OF THE INVENTION

The present invention relates generally to vehicle suspension systems that employ leaf springs, and more particularly to leaf springs incorporating layers of composite material and methods for fabricating said springs.

BACKGROUND OF THE INVENTION

Known leaf springs are constructed from several elongated strips or leaves of metal stacked one-on-top-of-the-other and clamped together in a substantially parallel relationship. Typically, these springs are employed in vehicle suspension systems in one of two different load carrying configurations, cantilevered, or three-point-bending; the latter being the more common method of use. A cantilevered leaf spring is one where the leaf spring is fixed or supported at one end to the frame of a vehicle and coupled to an axle at its other end. Alternatively, a leaf spring mounted in three-point-bending, is supported or fixed at one end to the vehicle with the other end supported in a manner that allows for relative movement of the spring. A load is carried by the spring between the two ends. The use of leaf springs mounted in three point bending is so widespread that the Society of Automotive Engineers (SAE) has developed a formal leaf spring design and use procedure.

Metal leaf springs constructed in the manner described above are incorporated into a variety of different vehicle suspensions including, automobiles, light to heavy trucks, trailers, construction equipment, locomotives, and railroad cars. They are also employed in recreational vehicles, such as bicycles, snowmobiles, and ATV's (all terrain vehicles). The leaf springs improve the quality or smoothness of the vehicle's ride by absorbing and storing energy for later release in response to bending and/or impact loads imposed on the vehicle resulting from such things as encountering obstructions in a road during the vehicle's operation.

The mechanical properties defining a vehicle suspension system, particularly the spring rate and static deflection of the leaf springs, directly influence the smoothness of the vehicle's ride. Generally, a smooth ride requires the leaf springs to have large static deflections. The smoothness of the ride is also influenced by the vibration damping characteristics of the leaf springs. Damping is a parameter that quantifies the ability of the leaf spring to dissipate vibratory energy. Therefore, a high degree of damping is desirable in leaf springs used in automobiles to minimize the vibratory amplitudes transferred to the passenger area.

The ability to accurately determine the mechanical properties and performance characteristics of a leaf spring is critical to the proper design of vehicle suspension systems. One of the problems resulting from the construction of conventional leaf springs is that the variable lengths of the stack of individual leaves creates a stepped spring construction that only approximates constant stress, the steps tend to create localized areas of high stress known as stress concentrations which detrimentally affect the load carrying capability and useful life of the leaf spring. In addition, the fact that the springs are composed of lengths of metal stacked one-on-top-of-the-other causes them to be quite heavy; this additional weight causes a concomitant reduction in fuel economy.

Moreover, because it is impossible to predict the exact conditions and stresses that a leaf spring will be subjected to, the fatigue life of the spring is generally limited. This problem is further exacerbated by the build-up of foreign material on and between the individual leaves. Not only does this cause corrosion, thereby weakening the leaf spring and making it more susceptible to fatigue failure, but it also affects the stiffness of the leaf spring and hence the smoothness of the ride of the vehicle in which the spring is employed. Generally the magnitude of the contribution made to the strength of a particular leaf spring due to inter-leaf friction is determined empirically. When foreign material gets between the leaves it can dramatically increase, in the case of particulate matter, or decrease, in the case of oil, the friction between the leaves, thereby altering the original mechanical properties of the spring. In addition, the shear conductivity between the leaves, which is a measure of the amount of shear stress transferred from leaf-to-leaf, is typically low in conventional leaf springs because the individual leaves are only clamped at the ends. Therefore, the stress transfer capability along the length of the spring is dependent on the aforementioned inter-leaf friction.

In many applications, leaf springs are loaded not only by vertical forces but also by horizontal forces and torques in the longitudinal vertical and transverse vertical planes. These forces are typically generated when the brakes on the vehicle incorporating the leaf spring are applied. The aforementioned horizontal forces and torques cause the leaf spring to assume an "S" shaped configuration, a phenomena referred to as "S-ing" or wrap-up. The stresses induced in the spring when this occurs can be quite high. In order to minimize S-ing in a leaf spring, the stiffness of the spring must be increased; however, this can detrimentally affect the smoothness of a vehicle's ride.

In order to address the above-described problems, those skilled in the art have attempted to fabricate purely composite leaf springs, wherein the individual leaves are formed from a composite material of the type consisting of a plurality of fibers embedded in a polymeric matrix. However, while these springs offered significant reductions in weight, as well as increased fatigue life and damping, their cost was prohibitive. In addition, these composite springs are difficult to fabricate and attach to the frame of a vehicle and required the use of special adapters. A hybrid leaf spring having a metal primary leaf with one or more layers of composite material bonded thereto has been proposed in U.S. patent application Ser. No. 08/906,747 to Meatto, Pilpel, Gordon and Gordon entitled "Hybrid Leaf Spring And Suspension System For Supporting An Axle On A Vehicle", filed on Aug. 6, 1997, the disclosure of which is incorporated herein by reference. The metal primary leaf also defined the means, for example, an aperture extending through each end of the leaf, to mount the spring to the vehicle.

Composite components usually comprise multiple individual layers of material juxtaposed, one on top of the other with adhesive material located between successive layers of the composite, thereby forming a laminate. As used herein, the term "composite material" should be construed to mean a fiber or particle reinforced polymeric material. To bond the layers of composite material together, the adhesive must be cured unless a thermoplastic adhesive is used which requires only melting and fusing. Curing is usually accomplished by heating the composite layers under pressure in a mold to a known curing temperature and then maintaining that temperature for a predetermined period of time.

A difficulty often encountered with producing laminated composite components in this manner is that the individual layers of composite material act as insulators. Therefore, to completely cure a multiple layer laminated composite part, long heating periods are required to allow the adhesive between the inner-most layers to reach curing temperature. This results in decreased productivity, increased energy consumption, wear on the mold, and higher overall cost. These problems are further exacerbated with respect to the above-described hybrid leaf spring because the metal primary leaf acts as a heat sink, drawing thermal energy away from the adhesive material.

Another difficulty encountered with producing hybrid leaf springs is that for applications with high spring rate camber designs, molded-in bond line shear stress between the primary leaf and composite layers can be relatively high so as to reduce fatigue life when the hybrid leaf spring is fully deflected under a full load.

Based on the foregoing, it is the general object of the present invention to provide a leaf spring and a method for fabricating the spring that overcomes the difficulties and drawbacks of prior art leaf springs.

SUMMARY OF THE INVENTION

The present invention is directed in one aspect to a method for making a hybrid leaf spring wherein at least one layer of composite material, and at least one metal primary leaf are laminated together. To facilitate the lamination process, the layer of composite material and the primary leaf are positioned adjacent to one another in an interior cavity defined by a mold. A layer of adhesive is located between and in engagement with the layer of composite material and the metal primary leaf.

Heating means are coupled to the metal primary leaf and are actuated via command signals generated by a controller having temperature profile data stored therein. During operation, the heating means imparts thermal energy to the metal primary leaf which in turn is transferred to, and cures the adhesive material.

Preferably, the heating means is of the resistance type with the metal primary leaf forming part of the heating circuit. In general, a voltage source is provided that includes at least two electrodes attached thereto. Each electrode is also releasably attached to an end of the metal primary leaf, thereby completing the circuit. The primary leaf defines an inherent resistance such that when the voltage source is actuated, the current flowing through the primary leaf, between the electrodes, causes the temperature of the primary leaf to increase. This thermal energy is then transferred from the primary leaf into the layer of adhesive material. The current is varied in response to command signals issued from the controller in order to create the appropriate temperature profile to allow the adhesive material to cure. While a resistance-type heating means has been described, the present invention is not limited in this regard as other types of heating means, such as, but not limited to an induction heater, or a convection-type heater can be substituted without departing from the broader aspects of the present invention.

In the preferred embodiment of the present invention, the above-described mold is constructed of a material referred to by those skilled in the art to which the invention pertains as "tooling board". This material is typically formed from epoxy or polyurethane with fillers, such as ceramics. The tooling board has low electrical conductivity, thereby reducing the potential for arcing that could result from the resistance-type heating described above. While a mold made from tooling board has been described, the present invention is not limited in this regard as other materials, such as, but not limited to metal, may be substituted without departing from the broader aspects of the present invention. Where the mold is metallic, heating means, such as cartridge heaters, or passages for hot oil can be incorporated into the mold to supply additional thermal energy to the hybrid leaf spring during curing of the adhesive.

In an embodiment of the present invention, the above-described at least one layer of composite material includes a plurality of layers of composite material. Each layer is positioned in the mold adjacent to, and approximately aligned with, the next successive layer of composite material with at least one of the layers being adjacent to the metal primary leaf. A layer of adhesive, curable in the above-described manner, is positioned between successive layers of the composite material, as well as between the metal primary leaf and any adjacent layers of composite material. The adhesive is then cured via a combination of heat and pressure.

Alternatively, a layer of elastomeric material is interposed between the composite layers, as well as between the metal primary leaf and any adjacent layers of composite material. A layer of adhesive is spread between the elastomeric material and the composite layers, as well as between the metal primary leaf and any adjacent layers of composite material. In order to prepare the metal primary leaf, the elastomeric material, and the layers of composite material to accept the adhesive, a surface preparation step is usually required. For the metal primary leaf, surface preparation can be accomplished via sandblasting, vapor blasting, or chemical etching, with sandblasting providing the added benefit of slag removal from the metal. Regarding the composite layers, surface preparation is usually achieved via sanding or diamond grinding. The elastomeric layers can be surface treated by, inter alia, etching or embossing. Thermoset type elastomers can also be sanded or ground, while thermoplastic material can be flame treated, corona discharge treated and inert plasma treated. In some instances, the above-described treatments can be combined with sanding and grinding.

Depending on the end use of the hybrid leaf spring made in accordance with the present method, it may be necessary to coat all or part of the spring with a protective coating to increase impact resistance. Alternatively, it may be necessary to coat only those areas where an adhesive layer is exposed to the outside environment.

In one embodiment of the hybrid leaf spring fabricated in accordance with the method of the present invention, pre-cured composite layers are employed with at least one face of each layer being machined or ground to provide the desired contour of the finished spring. When the machined layers of composite material are placed in the mold, the machined or ground face of one leaf becomes the bonding surface between that leaf and the metal primary leaf and is positioned adjacent to the metal primary leaf with a layer of adhesive therebetween. The precured composite layers, and the metal primary leaf can be assembled inside, or outside of the mold with a pin locating the components relative to one another. The pin can also be employed to aid in positioning the uncured spring to the mold.

In another embodiment of a method of fabricating a hybrid leaf spring in accordance with the present invention is employed for applications with high spring rate camber designs. For such applications, molded-in bond line shear stress can be relatively high and reduce fatigue life when the hybrid leaf spring is fully deflected under a full load. In accordance with the method of the present invention, a primary leaf is provided having a free height or initial camber, and at least one layer of composite material. A mold is provided having an interior cavity defined by at least one cavity wall. The interior cavity has a curvature for receiving the primary leaf therein at a depressed camber relative to that of the initial camber in order to pre-stress the primary leaf. The layer of composite material and the primary leaf are positioned adjacent to one another in the interior cavity. A layer of adhesive is positioned between and in engagement with the layer of composite material and the primary leaf. The layer of adhesive is cured for bonding together the primary leaf and the layer of composite material at the depressed camber to thereby reduce bond line shear stress. More specifically, the adhesive is cured at a depressed camber at or near the curb height of the spring so as to generally eliminate bond line shear stress when the camber of the hybrid leaf spring is at the curb height (i.e., the camber of the installed hybrid leaf spring when not absorbing loads).

The depressed camber of the hybrid leaf spring in the mold is between an unloaded camber and a curb load (i.e., full load) camber. The hybrid leaf spring is removed from the mold such that the camber of the removed hybrid leaf spring increases to a camber between that of the initial camber of the primary leaf and the depressed camber of the hybrid leaf spring in the mold.

DETAILED DESCRIPTION OF THE PREFERRED EMBODIMENTS

Figure 1:
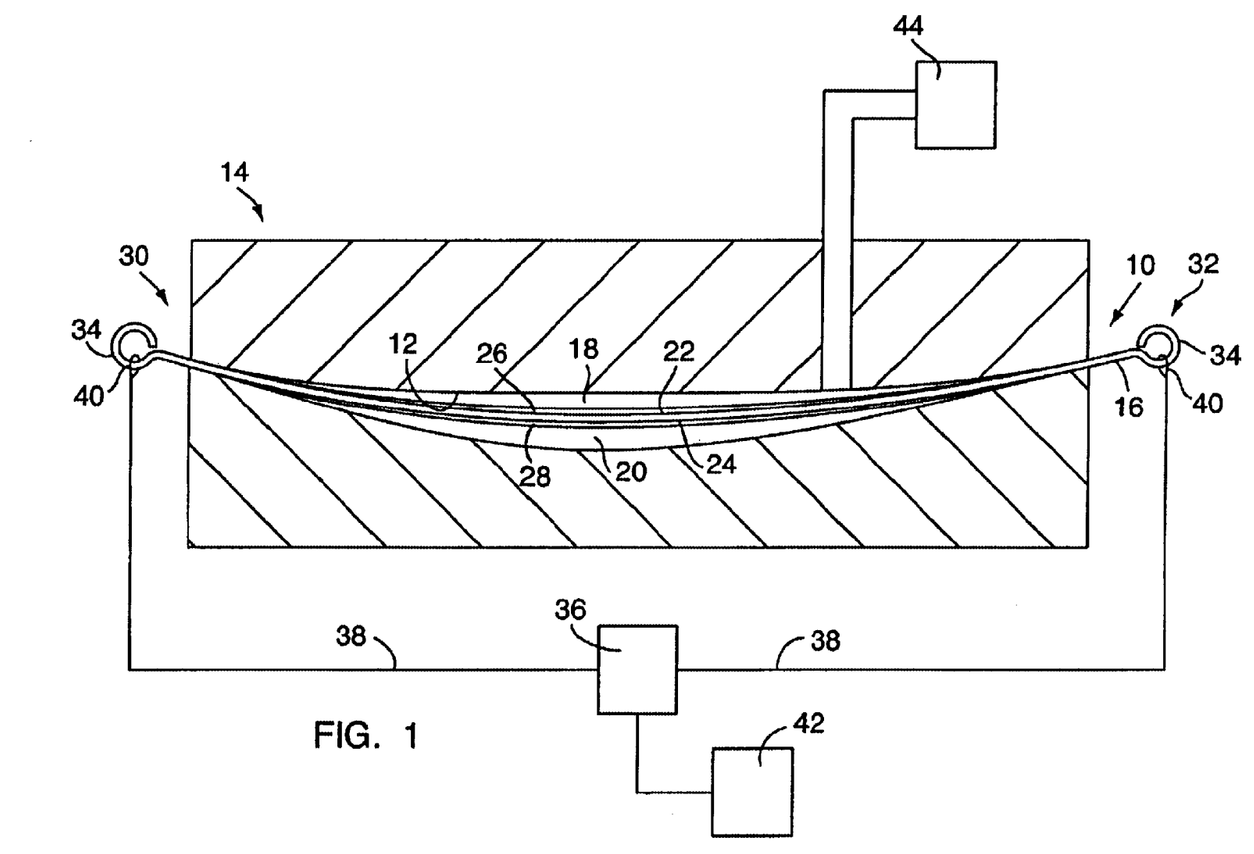
FIG. 1 is a partly schematic side elevational view of an embodiment of the hybrid leaf spring made in accordance with the method of the present invention, showing the metal primary leaf and layers of composite material positioned in a mold with a voltage source coupled to the primary leaf, thereby completing a circuit that causes the primary leaf to act as a resistance-type heater in response to an applied voltage.

As shown in FIG. 1, a hybrid leaf spring generally designated by the reference number 10 is positioned in a cavity 12 defined by a mold 14. The hybrid leaf spring 10 includes a primary leaf 16 with first and second layers of composite material, 18 and 20 respectively, located adjacent to a respective one of a first and second bonding surface, 22 and 24 respectively, defined by the primary leaf 16. A first layer of adhesive material 26 is interposed between the first layer of composite material 18 and the first bonding surface 22 and a second layer of adhesive material 28 is interposed between the second layer of composite material 20 and the second bonding surface 24.

In the illustrated embodiment, the metal primary leaf 16 includes opposed end sections 30 and 32, each defining a loop or eye 34. A voltage source 36 is in electrical communication with the primary leaf 16 via a pair of leads 38 extending therefrom, each having an end 40 coupled to one of the eyes 34. The voltage source 36 is also in communication with a controller 42, for generating command signals in accordance with temperature data stored therein. During operation, the voltage source 36 is energized in response to commands issued from the controller 42 causing a voltage to be induced across the metal primary leaf 16, which due to its inherent resistance, experiences an increase in temperature.

The operation of the controller 42 can be either via "open loop" control or "closed loop" control. In open loop control, a predetermined voltage input is employed to bring the spring to a known temperature. Conversely, in closed loop control, a sensor (not shown) monitors the temperature of the spring and provides signals receivable by the controller 42 that in turn adjusts the voltage supplied by the voltage source 36.

The temperature of the primary leaf 16 increases in response to commands issued from the controller to a degree sufficient to cure the first and second layers of adhesive, 26 and 28 respectively. The cured adhesive material acts to bond the first and second layers of composite material, 18 and 20 respectively, to the primary leaf 16. The interior cavity 12 of the mold 14 can also be pressurized via pump 44 which is in gaseous communication with the mold, thereby ensuring that the layers of composite material, and the metal primary leaf are properly positioned relative to one another as the adhesive cures. While a hybrid leaf spring having a first and second layer of composite material bonded to a primary leaf has been shown and described, the present invention is not limited in this regard as a single, or multiple layers of composite material can also be employed without departing from the broader aspects of the present invention.

Figure 2:
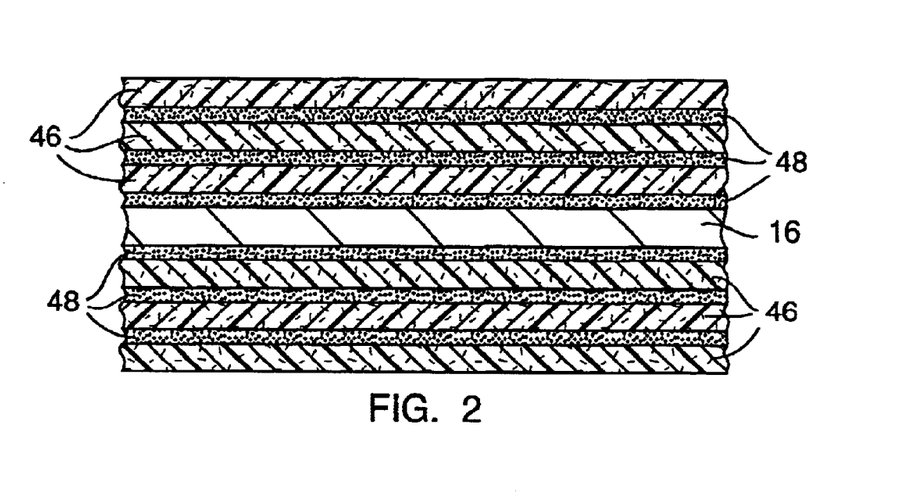
FIG. 2 is a partial, cross-sectional view of the hybrid leaf spring made in accordance with the method of the present invention, showing a spring employing multiple layers of composite material.

As shown in FIG. 2, where multiple layers 46 of composite material are incorporated into the hybrid spring, a layer of adhesive material 48 must be interposed between successive layers of the composite material, as well as between the primary leaf 16 and the next adjacent layer of composite material. The layers of adhesive are cured in the above-described manner, however, increased curing times must be provided for in order to allow all of the adhesive material to reach curing temperature.

Figure 3:
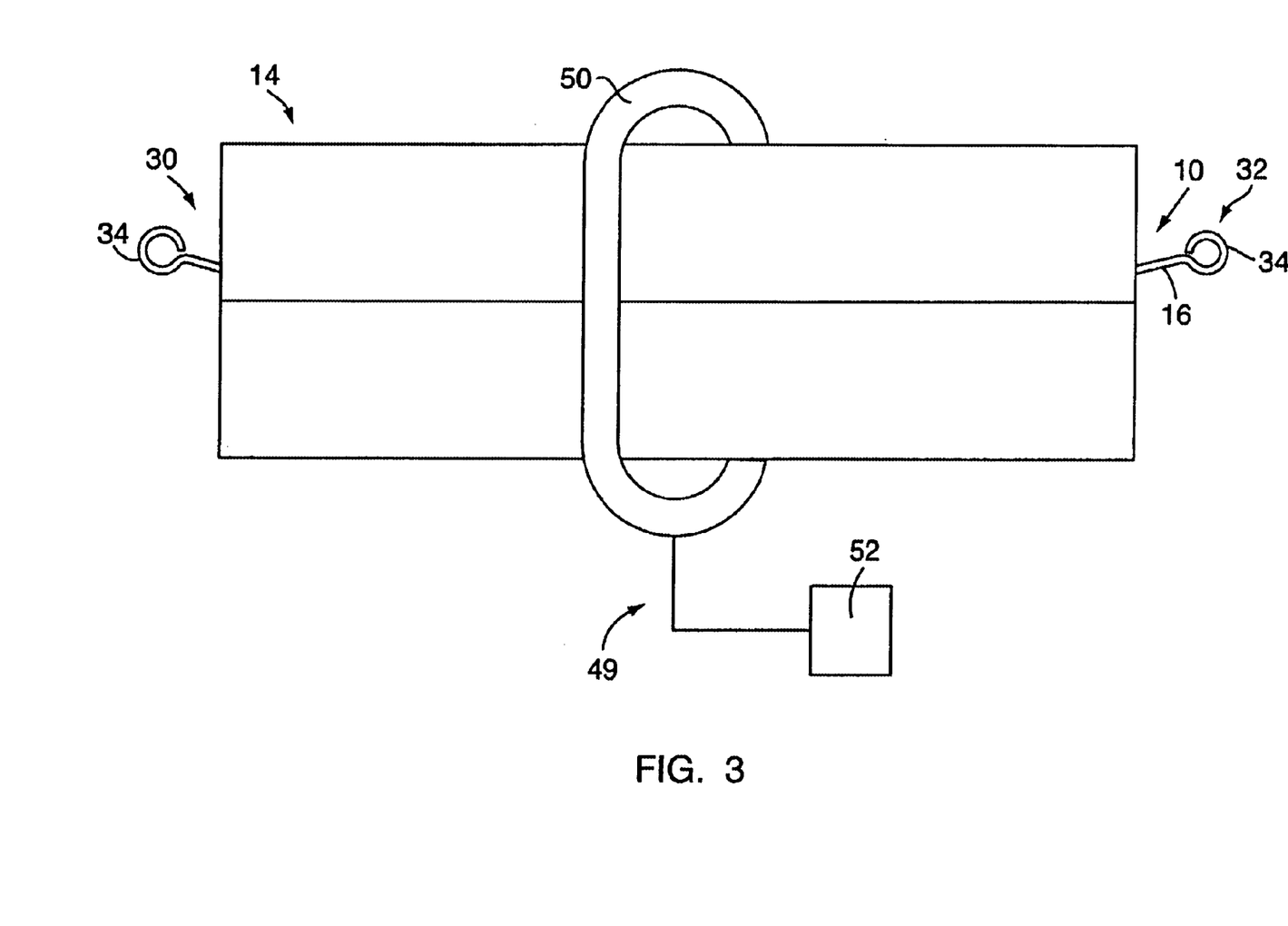
FIG. 3 is a partly schematic, side elevational view of an embodiment of the hybrid leaf spring made in accordance with the method of the present invention showing the metal primary leaf and layers of composite material positioned in a mold and surrounded in part by an induction-type heater.

Methods other than resistance heating can be employed to heat the layers of adhesive material to curing temperature and maintain an appropriate temperature profile. As schematically illustrated in FIG. 3, an induction-type heater generally designated by the reference number 49 can be employed to provide thermal energy to the metal primary leaf 16. In operation, the hybrid leaf spring 10, positioned in the mold with the layers of adhesive material in the uncured condition, is surrounded by a coil 50. An alternating current source 52 is in electrical communication with the coil, providing current to the coil 50. The current in turn generates an alternating magnetic flux around the hybrid spring 10. The current in the coil induces a current in the main leaf 16 which causes an increase in thermal energy. During operation, the temperature of the primary leaf 16 is allowed to increase to the curing temperature of the adhesive, and is held at such temperature until such time as the adhesive material is cured.

Figure 4:
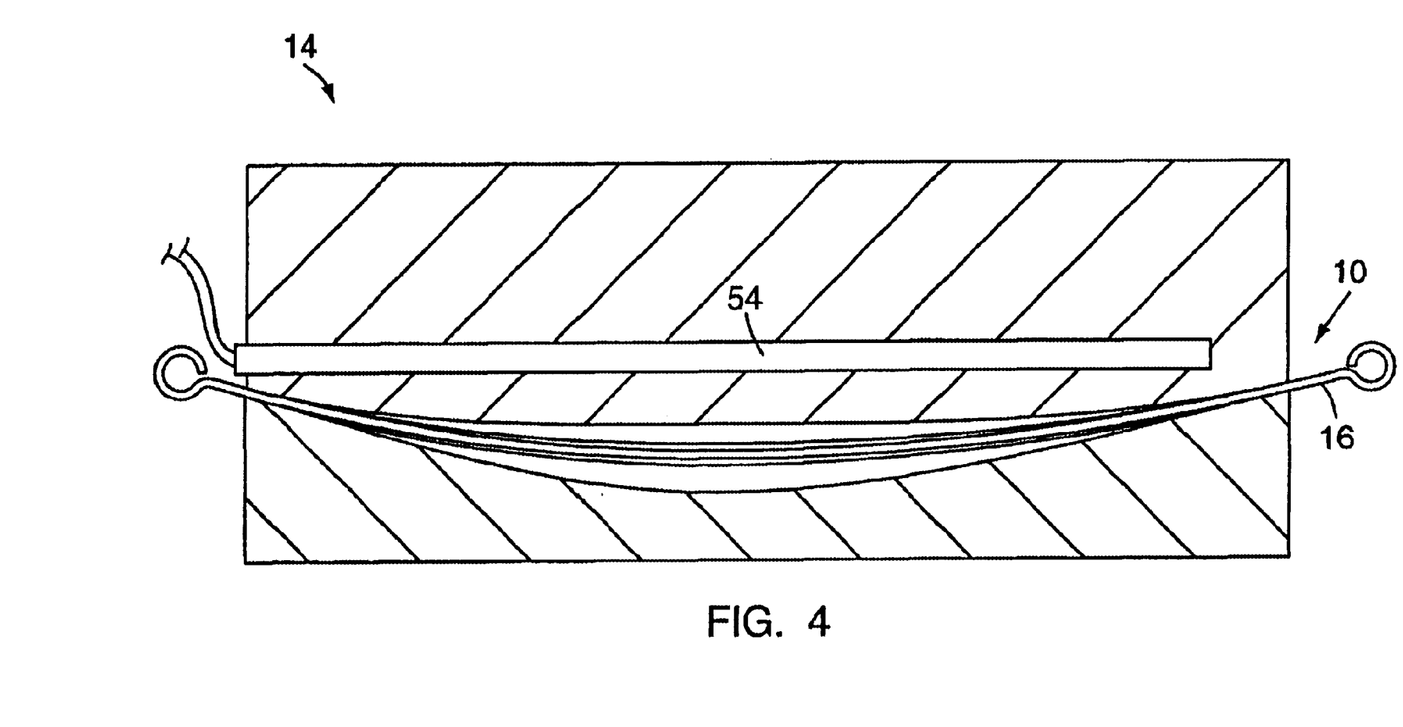
FIG. 4 is a partly schematic, side elevational view of the hybrid leaf spring made in accordance with the method of the present invention showing a mold heated via cartridge-type heaters.

As shown in FIG. 4, the mold 14 can be made from metal and heated via cartridge heaters 54 positioned in bores extending at least partway through the mold. Heating the mold 14 via the cartridge heaters along with simultaneously employing one of the above-described methods for heating the metal primary leaf 16 allows for attaining the adhesive cure temperature more rapidly than if only the primary leaf is heated. While cartridge heaters have been shown and described, the present invention is not limited in this regard as other methods of heating the mold known to those skilled in the pertinent art to which the invention pertains can be employed without departing from the broader aspects of the present invention. For example, hot oil can be pumped through passages defined by the mold, imparting thermal energy thereto. In addition, while the mold material has been described hereinabove as being metal, the present invention is not limited in this regard, as the mold can be fabricated from other suitable materials known to those skilled in the art to which the invention pertains, such as, but not limited to composites, ceramics, or ceramic filled composites without departing from the broader aspects of the present invention.

Referring back to FIGS. 1 and 2, the layers of composite material can assume different configurations. For example, the layers can be precured and then machined to adapt to the desired contour of a finished hybrid spring, or prepreg, or wet layers can be laid up in the mold adjacent to one another, as well as to the primary leaf 16. In each of these configurations, layers of adhesive positioned and cured in the above-described manner are employed.

Figure 5:
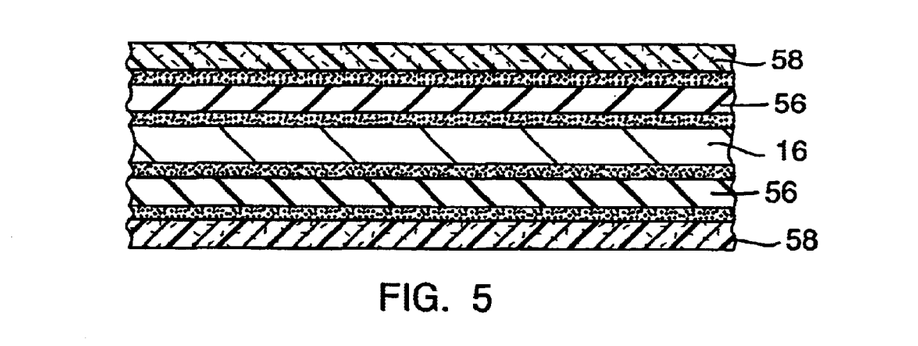
FIG. 5 is a partial cross-sectional view of the hybrid leaf spring of FIG. 2 showing layers of elastomeric material between layers of composite material, and the primary leaf.

As shown in FIG. 5, layers of elastomeric material 56 can be interposed between successive layers of composite material 58, as well as between the primary leaf 16 and any adjacent layers of composite material to provide enhanced damping characteristics to the hybrid spring. The layers of elastomeric material 56 are bonded to the layers of composite material and the metal primary leaf 16 by layers of adhesive material. Prior to assembly in the mold, the surfaces of the hybrid leaf spring components which contact the adhesive material, hereinafter referred to as bonding surfaces, are treated or prepared to make them more receptive to the adhesive. Regarding the metal primary leaf 16, surface preparation can be accomplished via sandblasting, vapor blasting, or chemical etching, with sandblasting providing the added benefit of slag removal from the metal. Regarding the composite layers, surface preparation is usually achieved via sanding or diamond grinding. The elastomeric layers can be surface treated by, inter alia, etching or embossing. Thermoset type elastomers can also be sanded or ground, while thermoplastic material can be flame treated, corona discharge treated, inert plasma treated, and in some instances these treatments can be combined with sanding and grinding.

Depending on the end use of the hybrid leaf spring made in accordance with the present method, it may be necessary to coat all or part of the spring with a protective coating to increase impact resistance. Alternatively, it may be necessary to coat only those areas where an adhesive layer is exposed to the outside environment.

Figure 7:
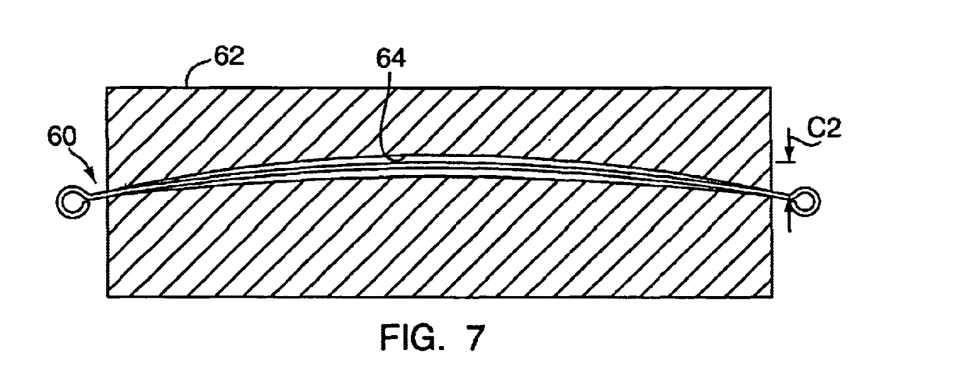
FIG. 7 is a side elevational view of a mold defining an interior cavity having a curvature for forming the primary leaf element of FIG. 6 at a modified unloaded camber that is lower than the initial camber, and at a camber near or at curb height.
Figure 8:
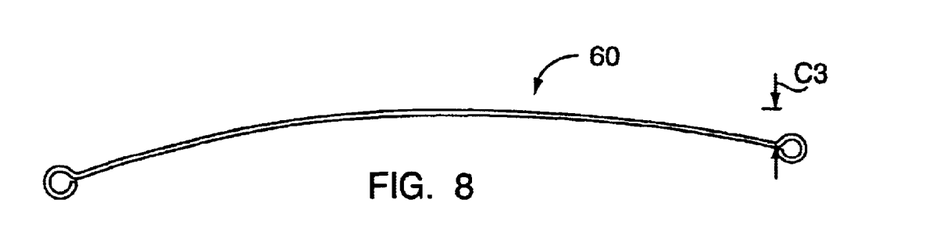
FIG. 8 is a side elevational view of the primary leaf element of FIG. 6 exhibiting the modified unloaded camber after a molding operation.

Another method for producing a hybrid leaf spring will be explained with reference to FIGS. 6–8. For applications with high spring rate camber designs, molded-in bond line shear stress can be relatively high and reduce fatigue life when the hybrid leaf spring is fully deflected under a full load. As explained more fully below, to reduce the bond line shear stress developed at maximum deflection, the spring can be molded at an intermediate camber at or near the curb height of the spring between full load and no load so as to generally eliminate or otherwise cause zero bond line shear stress when the camber of the hybrid leaf spring is at the curb height. The primary leaf, preferably a metal such as steel, must have additional camber prior to the molding operation such that after molding, the hybrid leaf spring rises to the desired camber. For simplicity of illustration the method described with respect to FIGS. 6–8 shows a primary leaf without composite layers bonded thereto.

Figure 6:
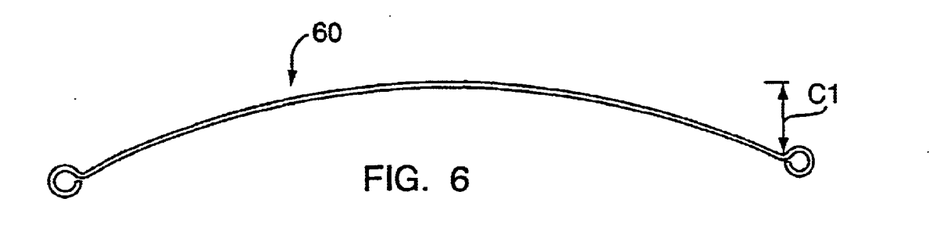
FIG. 6 is a side elevational view of a primary leaf element having an initial unloaded camber prior to a molding operation.

Turning now to FIG. 6, a primary leaf 60 is provided having an initial unstressed camber C1. As shown in FIG. 7, a mold 62 has an interior cavity 64 defined by at least one cavity wall. The interior cavity 64 has a curvature for receiving the primary leaf 60 therein at a depressed camber C2 relative to that of the initial unstressed camber C1 to pre-stress the primary leaf. The depressed camber C2 is predetermined to be between an unloaded camber and a curb load camber of the hybrid leaf spring. The primary leaf 60 is adhesively engaged with at least one layer of composite material (not shown) as described in the hereinabove embodiments, and positioned in the interior cavity 64 and cured as previously described. After the adhesive is cured in the mold 62, the hybrid leaf spring is removed and reverts to an unstressed state such that the camber of the removed hybrid leaf spring increases to a camber C3 that is between that of the initial unstressed camber C1 of the primary leaf and the depressed camber C2 of the hybrid leaf spring in the mold.

While preferred embodiments have been shown and described, various modifications and substitutions may be made without departing from the spirit and scope of the invention. Accordingly, it is to be understood that the present invention has been described by way of example and not by limitation.

What is claimed is:

1. A method of making a hybrid leaf spring comprising the steps of:
   providing a primary leaf having an initial camber;
   providing at least one layer of composite material;
   providing a mold having an interior cavity defined by at least one cavity wall, the interior cavity having a curvature for receiving the primary leaf therein at a depressed camber relative to that of the initial camber;
   providing heating means for independently controlling the temperature of the primary leaf;
   positioning the layer of composite material and the primary leaf adjacent to one another in the interior cavity;
   providing a layer of adhesive between, and in engagement with, the layer of composite material and the primary leaf; and
   curing the layer of adhesive for bonding together the primary leaf and the layer of composite material at the depressed camber so as to generally eliminate bond line shear stress when the camber of the hybrid leaf spring is at the curb height.

2. A method of making a hybrid leaf spring as defined in claim 1, wherein the depressed camber of the hybrid leaf spring in the mold is between an unloaded camber and a curb load camber.

3. A method of making a hybrid leaf spring as defined in claim 1, further including the step of removing the hybrid leaf spring from the mold such that the camber of the removed hybrid leaf spring increases to a between that of the initial camber of the primary leaf and the depressed camber of the hybrid leaf spring in the mold.

4. A method of making a hybrid leaf spring as defined in claim 1, wherein the primary leaf is fabricated from metal.

5. A method of making a hybrid leaf spring as defined in claim 1, wherein the primary leaf is fabricated from steel.

6. A method of making a hybrid leaf spring as defined in claim 1, wherein the mold is fabricated from metal.

7. A method of making a hybrid leaf spring comprising the steps of:

providing a primary leaf having an initial camber;

providing at least one layer of composite material;

providing a mold having an interior cavity defined by at least one cavity wall, the interior cavity having a curvature for receiving the primary leaf therein at a depressed camber relative to that of the initial camber;

providing heating means for independently controlling the temperature of the primary leaf;

positioning the layer of composite material and the primary leaf adjacent to one another in the interior cavity;

providing a layer of adhesive between, and in engagement with, the layer of composite material and the primary leaf;

providing a controller having heating data stored therein for generating command signals to the heating means;

actuating the heating means in response to commands generated by the controller, thereby causing thermal energy to conduct into the layer of adhesive and the layer of composite material; and curing the layer of adhesive by operating the heating means in accordance with the heating data for bonding together the primary leaf and the layer of composite material at the depressed camber so as to generally eliminate bond line shear stress when the camber of the hybrid leaf spring is at the curb height.

8. A method of making a hybrid leaf spring as defined in claim 7, wherein the depressed camber of the hybrid leaf spring in the mold is between an unloaded camber and a curb load camber.

9. A method of making a hybrid leaf spring as defined in claim 7, further including the step of removing the hybrid leaf spring from the mold such that the camber of the removed hybrid leaf spring increases to a between that of the initial camber of the primary leaf and the depressed camber of the hybrid leaf spring in the mold.

10. A method of making a hybrid leaf spring as defined in claim 7, wherein the primary leaf is fabricated from metal.

11. A method of making a hybrid leaf spring as defined in claim 7, wherein the primary leaf is fabricated from steel.

12. A method of making a hybrid leaf spring as defined in claim 7, wherein the mold is fabricated from metal.

* * * * *

UNITED STATES PATENT AND TRADEMARK OFFICE
CERTIFICATE OF CORRECTION

PATENT NO. : 6,660,114 B2
DATED : December 9, 2003
INVENTOR(S) : Frank Meatto et al.

It is certified that error appears in the above-identified patent and that said Letters Patent is hereby corrected as shown below:

<u>Title page,</u>
Item [75], Inventor, please delete "Vista, CA (US)" and replace it with
-- Montrose, CO (US) --.

Signed and Sealed this

Thirtieth Day of March, 2004

JON W. DUDAS
*Acting Director of the United States Patent and Trademark Office*